(12) United States Patent
Xia et al.

(10) Patent No.: US 10,192,336 B2
(45) Date of Patent: Jan. 29, 2019

(54) METHOD AND APPARATUS FOR ESTABLISHING ULTRA-LARGE CHARACTER LIBRARY AND METHOD AND APPARATUS FOR DISPLAYING CHARACTER

(71) Applicants: Peking University Founder Group Co., Ltd., Beijing (CN); Founder Information Industry Holdings Co., Ltd., Beijing (CN); Beijing Founder Electronics Co., Ltd., Beijing (CN)

(72) Inventors: Lining Xia, Beijing (CN); Yingmin Tang, Beijing (CN)

(73) Assignees: Peking University Founder Group Co., Ltd., Beijing (CN); Founder Information Industry Holdings Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 122 days.

(21) Appl. No.: 14/902,957

(22) PCT Filed: Dec. 5, 2013

(86) PCT No.: PCT/CN2013/088623
§ 371 (c)(1),
(2) Date: Jan. 5, 2016

(87) PCT Pub. No.: WO2015/000259
PCT Pub. Date: Jan. 8, 2015

(65) Prior Publication Data
US 2016/0180563 A1 Jun. 23, 2016

(30) Foreign Application Priority Data
Jul. 5, 2013 (CN) .......................... 2013 1 0282313

(51) Int. Cl.
*G06T 11/60* (2006.01)
*G06T 1/60* (2006.01)
(Continued)

(52) U.S. Cl.
CPC .............. *G06T 11/60* (2013.01); *G06F 9/451* (2018.02); *G06F 17/214* (2013.01); *G06F 17/2223* (2013.01); *G06T 1/60* (2013.01)

(58) Field of Classification Search
None
See application file for complete search history.

(56) References Cited

U.S. PATENT DOCUMENTS 5,982,387 A * 11/1999 Hellmann ............... G06K 15/02
345/467
7,900,143 B2 * 3/2011 Xu ....................... G06F 17/2217
715/269
(Continued)

FOREIGN PATENT DOCUMENTS

| CN | 101241505 A | 8/2008 |
|---|---|---|
| CN | 101694603 A | 4/2010 |
| JP | 2005501303 A | 1/2005 |

OTHER PUBLICATIONS

Japanese Office Action for App. No. JP2016-522188, dated Mar. 21, 2017.
(Continued)

Primary Examiner — Tize Ma
(74) Attorney, Agent, or Firm — Brinks Gilson & Lione

(57) ABSTRACT

A method and apparatus for establishing an ultra-large character library and a method and apparatus for displaying a character are disclosed. The displaying method comprises: intercepting by a font engine middleware a font invoking message sent from a system font engine, the font invoking message comprising a character code and a font name corresponding to a character to be displayed by an applica-
(Continued)

tion; acquiring outline data corresponding to the character from an ultra-large character library in a non-standard format based on the character code and font name; transmitting the outline data of the character to the system font engine to enable the system font engine to display the character according to the character outline data. With this invention, the capacity of the character library may be increased and characters in the non-standard-format ultra-large character library may be recognized conveniently, thus efficiency of character retrieval and display is improved.

10 Claims, 3 Drawing Sheets

(51) Int. Cl.
*G06F 17/21* (2006.01)
*G06F 17/22* (2006.01)
*G06F 9/451* (2018.01)

(56) References Cited

U.S. PATENT DOCUMENTS

2002/0120654 A1* 8/2002 Xu ............... G06F 17/2217
715/264
2013/0181995 A1* 7/2013 Zhou ............... G06F 17/214
345/467

OTHER PUBLICATIONS

Article—D2—"The Structure of the OpenType font"—Apr. 10, 2005.
Article—D3—Windows bitmap fonts etc . . . Oct. 1, 1992, vol. 16, No. 10, pp. 314-315.
Japanese Decision of Final Rejection for JP 2016-522188, dated Mar. 6, 2018 (7 Pages).

* cited by examiner

METHOD AND APPARATUS FOR ESTABLISHING ULTRA-LARGE CHARACTER LIBRARY AND METHOD AND APPARATUS FOR DISPLAYING CHARACTER

CROSS-REFERENCE TO RELATED APPLICATIONS

This application is a national application of PCT/CN2013/088623, filed on Dec. 5, 2013, which is incorporated herein by reference in its entirety.

BACKGROUND

Technical Field

This invention relates to the technical field of computer text entry, and particularly to a method and apparatus for establishing an ultra-large character library and a method and apparatus for displaying a character.

Description of the Related Art

Character libraries commonly used in the art generally have only a small number, generally about 6000, of characters. Thus it is possible to contain all of such small number of characters in one character library file. Even in the character library of GBK or 18030 code, there are only about 20,000-30,000 characters and it is also possible to hold and display these characters by using one character library file. However, in some occasions, more characters are needed, for example, those used in some special domains, and as a result, the number of characters to be stored in a character library may exceed 60,000. Due to the limitation of the data structure of character libraries, it might be very difficult to store so many characters in a single character library. Even in storing so many characters in a single character library, displaying those characters will be problematic. In this case, those characters have to be divided into two groups and are stored into two or even more character library files separately. A "font link" method has been provided by Microsoft Corporation, with which two character libraries can be linked together. For example, in the case of character libraries A and B storing different parts of characters therein separately, when the character library A is specified as the selected font, if the user enters a character stored in the character library B, this character can also be displayed by utilizing the font link method. This method is simple but has some defects, particularly, in the case of displaying characters on other planes than plane 0 (Characters on plane 0 have Unicode codes in the range of 0X0000~0xFFFF. Characters on plane 1 have Unicode codes in the range of 0X10000~0x1FFFF, characters on plane 2 have Unicode codes in the range of 0X20000~0x2FFFF, and so on), in some occasions, it is unable to invoke or display those characters. Further, as the number of characters to be coded increases, it is necessary to link more and more character libraries, and thus the efficiency of character retrieval and display is deteriorating.

SUMMARY OF THE INVENTION

An aspect of this invention is to provide a method and apparatus for establishing an ultra-large character library, in order to solve the problem in the prior art that the number of characters contained in a character library is limited due to the limitation of the data structure of the character library.

Another aspect of this invention is to provide a method and apparatus for displaying a character, in order to easily and conveniently identify characters in an ultra-large character library in a non-standard format, so as to improve the efficiency of character retrieval and display.

Thus, this invention provides the following technical solutions:

A method for establishing an ultra-large character library, comprising:
  establishing a boot character library;
  establishing an ultra-large character library in a non-standard format;
  creating a font engine middleware for interpreting the ultra-large character library.

Preferably, the boot character library comprises only basic ASCII symbols.

Preferably, codes in the ultra-large character library in the non-standard format are 4-byte codes.

Preferably, the ultra-large character library in the non-standard format comprises: a code table for storing a correspondence between character codes and indexes, a position information table for storing a correspondence between the indexes and character data offsets, and a glyph table for storing character outline data.

A method for displaying a character, comprising:
  intercepting, by a font engine middleware, a font invoking message sent from a system font engine, the font invoking message comprising a character code and a font name corresponding to a character to be displayed by an application;
  acquiring outline data corresponding to the character from an ultra-large character library based on the character code and the font name, the ultra-large character library being a character library in a non-standard format;
  transmitting the outline data of the character to the system font engine, to enable the system font engine to display the character according to the character outline data.

Preferably, intercepting by a font engine middleware a font invoking message sent from a system font engine comprises:
  intercepting the font invoking message by the font engine middleware using a hook function, and obtaining the character code and the font name.

Preferably, acquiring outline data corresponding to the character from an ultra-large character library based on the character code and the font name comprises:
  searching the ultra-large character library for a font file based on the font name;
  obtaining an index value corresponding to the character code from the found font file based on the character code;
  obtaining outline data of the character from a character outline data table based on the index value.

An apparatus for establishing an ultra-large character library, comprising:
  a boot character library establishing unit, configured for establishing a boot character library;
  an ultra-large character library establishing unit, configured for establishing an ultra-large character library in a non-standard format;
  a middleware creating unit, configured for creating a font engine middleware for interpreting the ultra-large character library.

An apparatus for displaying a character, comprising:

an interception unit, configured for intercepting a font invoking message sent from a system font engine, the font invoking message comprising a character code and a font name corresponding to a character to be displayed by an application;

an outline data acquisition unit, configured for acquiring outline data corresponding to the character from an ultra-large character library based on the character code and the font name, the ultra-large character library being a character library in a non-standard format;

a transmission unit configured for transmitting the outline data of the character to the system font engine to enable the system font engine to display the character according to the character outline data.

Preferably, the interception unit is configured to intercept the font invoking message by using a hook function, and obtain the character code and the font name.

Preferably, the outline data acquisition unit comprises:

a font file searching subunit, configured for searching the ultra-large character library for a font file based on the font name;

an index value searching subunit, configured for obtaining an index value corresponding to the character code from the found font file based on the character code;

an obtaining subunit, configured for obtaining outline data of the character from a character outline data table according to the index value.

The method and apparatus for establishing an ultra-large character library according to embodiments of the present invention adopt the ultra-large character library in a non-standard format, and thus allow more characters to be accommodated therein. Meanwhile, in order to enable the system font engine to recognize characters contained in the ultra-large character library, a corresponding font engine middleware and a boot character library are established accordingly.

Based on the above boot character library and the font engine middleware, with the method and apparatus for displaying character according to embodiments of the present invention, the ultra-large character library can be interpreted by the system font engine with the assistance of the font engine middleware, information regarding the character to be displayed is retrieved from the ultra-large character library, and is reconfigured into an information format required by the system font engine, and then sent to the system font engine; finally, the system font engine displays the character on a user interface. In doing so, the problems in the prior art that the efficiency of invocation through the linking mechanism is low and it is unable to invoke characters in different character libraries from each other may be solved.

With this invention, the number of characters contained in a single character library may be increased, and characters in the ultra-large character library in the non-standard format may be identified easily and conveniently. Thus, the efficiency of character retrieval and displaying is improved.

BRIEF DESCRIPTION OF THE DRAWINGS

To clearly illustrate embodiments of the present application or those solutions in the prior art, a simple description of accompanying drawings used in the embodiments will be made below. Apparently, drawings to be described below represent merely some embodiments of this invention, from which other drawings may be derived by those skilled in the art.

DESCRIPTION OF THE EMBODIMENTS

To achieve a better understanding of the solutions of embodiments according to the present invention for those skilled in the art, the embodiments of the present invention will be described in details with reference to the accompanying drawings in the following.

With the TrueType character library commonly used in current operating systems, it is unable to construct a single ultra-large character library containing more than 65535 characters. Due to the limitation of the data structure of the character library format, the character library cannot accommodate more than 65535 characters. Even if more than 65535 characters are stored in the character library, those characters cannot be invoked by the font engine of the operating system, or even the character library would be considered as invalid. Most of existing methods for solving this problem adopt font linking, by which two or more character libraries are linked together for the purpose of displaying more characters. However, such method has still some drawbacks that, for example, in the current operating systems, in the case of a character library including CJK-ExtB characters of the ISO/IEC 10646 coded character set, characters in a character library including CJK-Ext A characters can be entered and displayed through font linking, but not vice versa; upon font linking two character libraries each including a basic plane and Plane 2 of the ISO/IEC 10646 coded character set, characters on their Planes 2 cannot be invoked from each other; and so on. As the number of characters to be coded increases, more and more planes have been used in the ISO/IEC 10646 coded character set, and more and more character libraries need to be linked, resulting in even more deteriorated efficiency of character retrieval.

In view of this, a method and apparatus of establishing an ultra-large character library are provided in embodiments of this invention. On the basis of an existing character library format and displaying method, a TrueType-based ultra-large character library capable of storing more characters is established. To address the problem of not supporting this non-standard format by current operating systems, a font engine middleware and a boot character library are established.

Correspondingly, based on this kind of ultra-large character library, a character display method and apparatus are also provided in embodiments of this invention. An ultra-large character library in a non-standard format is interpreted by a system font engine with the assistance of a font engine middleware. Information regarding a character to be displayed is retrieved from the ultra-large character library, and is reconfigured into an information format required by the system font engine, and then sent to the system font engine. Finally, the system font engine displays the character on a user interface.

Figure 1:
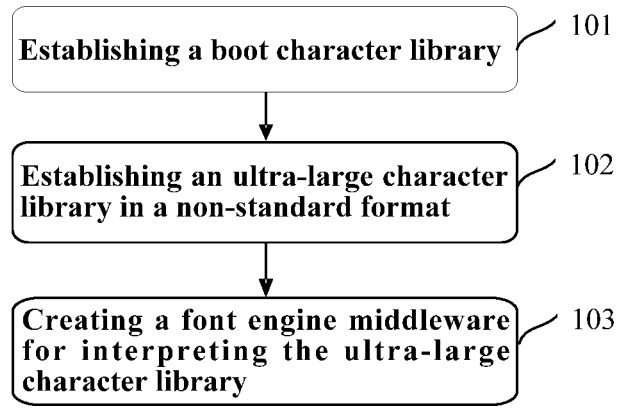
FIG. 1 is a flowchart of a method for establishing an ultra-large character library according to an embodiment of this invention.

As shown in FIG. 1, the method of establishing an ultra-large character library according to an embodiment of the present invention comprises the following steps:

Step 101: establishing a boot character library.

Compared with existing character libraries in the standard format, the boot character library may be in a standard format, but comprise only basic ASCII symbols, no actual Chinese characters.

Step 102: establishing an ultra-large character library in a non-standard format.

In establishing the ultra-large character library, due to the large number of characters which cannot be all contained in a standard-format character library, the characters are stored in a non-standard format. That is to say, the ultra-large character library is a character library in a non-standard format. Particularly, some modifications may be made to the existing standard format, for example, the number of bytes of a code may be changed from 2 to 4, so that up to 0xFFFFFFFF characters may be stored, instead of 0xFFFF as the original format, which may meet the requirement of the ultra-large character library.

Characters to be stored may be organized into a character library in a desired way by respective font developers or individuals. Due to the large number of characters, the characters may not be organized completely in the standard format. Thus, a dedicated font engine is required for interpretation.

The ultra-large character library in the non-standard format may mainly comprise: a code table for storing a correspondence between character codes and indexes, a position information table for storing a correspondence between the indexes and character data offsets, a glyph table for storing character outline data, and so on. Compared with the existing standard-format character library, in the ultra-large character library, improvements are made on the codes, the indexes and the offsets to expand their scopes, enabling the ultra-large character library to accommodate more characters.

Step 103: creating a font engine middleware for interpreting the ultra-large character library.

Only standard-format character library may be directly interpreted by the existing system font engine, and a character library in a non-standard format will be regarded as invalid by the system font engine. Thus, in order to recognize characters contained in the ultra-large character library, in the embodiment of the present invention, a font engine middleware is established, such that the system font engine may invoke the font engine middleware to assist the interpretation of the ultra-large character library, retrieve information regarding a character to be displayed from the ultra-large character library, reconfigure it into an information format required by the system font engine, and then send the reconfigured information to the system font engine. Finally, the system font engine displays the character on a user interface.

The ultra-large character library described in this embodiment of the present invention is particularly suitable for companies or individuals wishing to store more than 60,000 characters in a single character library.

It can be seen that, with the method of the embodiment of the present invention, the capacity of the character library may be increased, enabling users to conveniently and easily use different characters.

Figure 2:
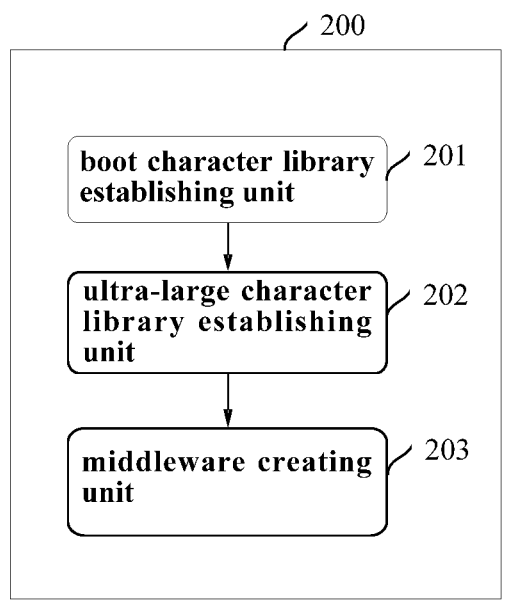
FIG. 2 is a schematic diagram showing a structure of an apparatus for establishing an ultra-large character library according to an embodiment of this invention.

Correspondingly, an apparatus of establishing an ultra-large character library is also provided in an embodiment of this invention. FIG. 2 shows a schematic diagram of the structure of this apparatus.

In this embodiment, the apparatus 200 comprises: a boot character library establishing unit 201, an ultra-large character library establishing unit 202 and a middleware creating unit 203. The boot character library establishing unit 201 is configured to establish a boot character library. The ultra-large character library establishing unit 202 is configured for establishing an ultra-large character library in a non-standard format. The middleware creating unit 203 is configured for creating a font engine middleware for interpreting the ultra-large character library.

Correspondingly, based on the non-standard-format ultra-large character library as described above, a method of displaying a character is also provided in an embodiment of this invention. To make those skilled in the art better understand the solution of the embodiment of the present invention and differences between the solution of the embodiment of the present invention and the prior art, firstly, a brief description of a method for displaying a character in the prior art will be made below.

Figure 3:
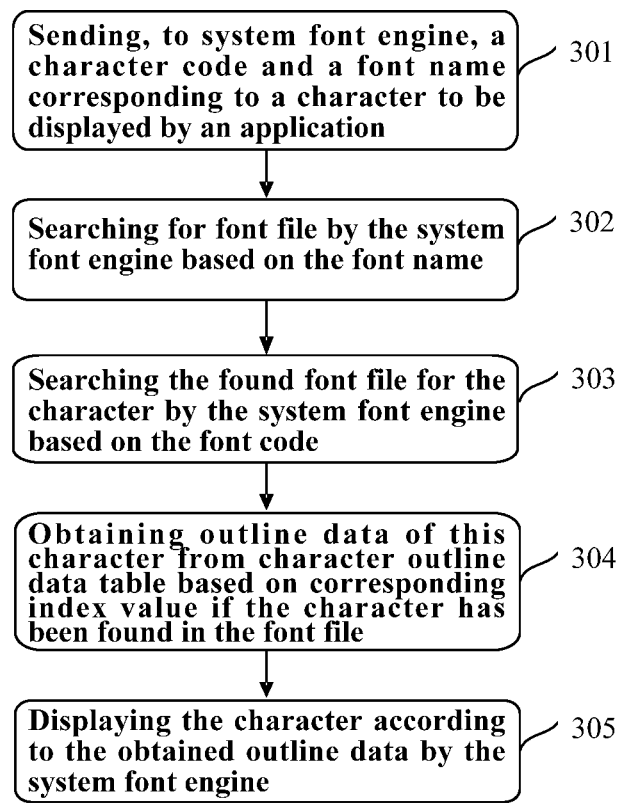
FIG. 3 is a flowchart of displaying a character contained in a character library in the prior art.

As shown in FIG. 3, in the prior art, a method of displaying a character contained in a character library comprises the following steps:

Step 301: sending, to system font engine, a character code and a font name corresponding to a character to be displayed by an application.

Step 302: searching for font file by the system font engine based on the font name.

Step 303: searching the found font file for the character by the system font engine based on the font code.

Particularly, the searching may be performed according to a code-index correspondence table in the font file.

Step 304: obtaining outline data of this character from character outline data table based on corresponding index value if the character has been found in the font file.

Step 305: displaying the character according to the obtained outline data by the system font engine.

Because the storage range of such ultra-large character library as describe above exceeds the standard range, this non-standard-format ultra-large character library cannot be supported by existing operating systems. Thus, in the method of displaying the character according to the embodiment of the present invention, the system font engine invokes a font engine middleware to facilitate the retrieve and displaying of characters contained in the ultra-large character library, greatly improving the efficiency of displaying character.

Figure 4:
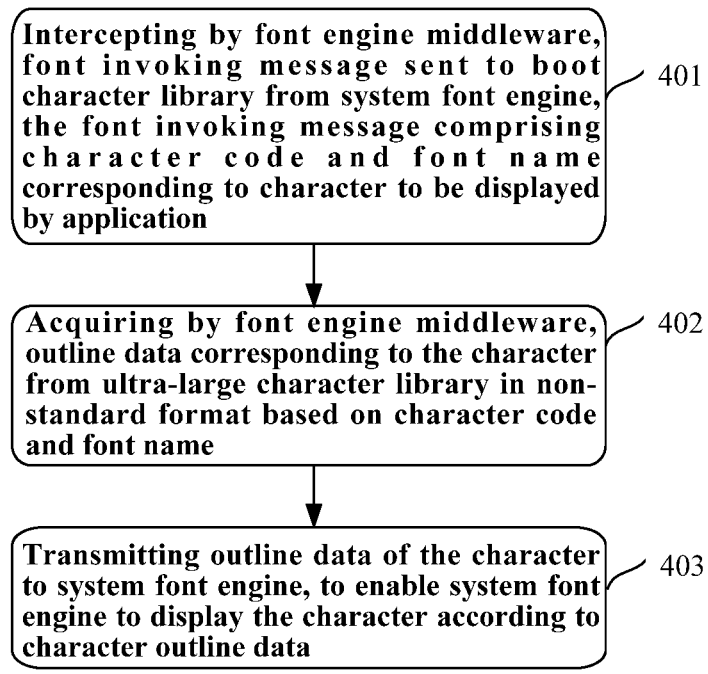
FIG. 4 is a flowchart of a method for displaying a character according to an embodiment of this invention.

As shown in FIG. 4, the flowchart of the method for displaying a character according to an embodiment of the present invention comprises the following steps:

Step 401: a font engine middleware intercepts a font invoking message sent from a system font engine to a boot character library, the font invoking message comprising a character code and a font name corresponding to a character to be displayed by an application.

Particularly, the font engine middleware intercepts the font invoking message by using a hook function available on the WINDOWS operating systems, and obtains the character code and the font name. The hook function may intercept not only messages transmitted in WINDOWS operating systems, but also calls to function, including application calls to function or operating system calls to function.

Step 402: the font engine middleware acquires outline data corresponding to the character from an ultra-large character library in a non-standard format based on the character code and the font name.

Compared with existing standard-format character libraries, the ultra-large character library may contain information regarding more character codes and more outline data.

In a particular implementation, a one-to-one correspondence may be established between the boot character library and the ultra-large character library, and then may be introduced into the font engine middleware. When the font engine middleware knows that the system font engine wants to invoke the boot character library, it may convert the access of the system font engine to the boot character library into an access to the ultra-large character library according to the correspondence.

The process of obtaining outline data from the ultra-large character library by the font engine middleware is similar to the process of obtaining outline data from the boot character library by the existing system font engine. Firstly, it is required to determine a font file to be read based on the intercepted font name. Then, an index value corresponding to the character code is obtained based on the intercepted character code and a CMAP table (character code-index correspondence table) in the font file. Then, according to the index value, an offset of a character corresponding to the index value in a GLYF table is found in a LOCA table. After obtaining this offset, glyph outline data may be directly read out from the GLYF table. The GLYF table stores glyph outline data of all characters.

It should be noted that the above CMAP table, the LOCA table, and the GLYF table are similar as corresponding ones in the character libraries in the prior art, and will not be described in detail herein.

Step 403: the outline data of the character is returned to the system font engine to enable the system font engine to display the character according to the character outline data.

In the character displaying method of the embodiment of the present invention, the font engine middleware is used to intercept a font invoking message sent from the system font engine to the boot character library, so that the access of the system font engine to the boot character library is converted into an access of the font engine middleware to the ultra-large character library. After the access to the ultra-large character library, glyph outline data thus obtained is returned to the system font engine, thereby the retrieve and displaying of the character in the ultra-large character library may be realized in a simple and convenient manner, greatly increasing the efficiency of character displaying. From the view of the application layer, it appears that the access is performed by the system font engine itself, without any effect on users' experience.

Figure 5:
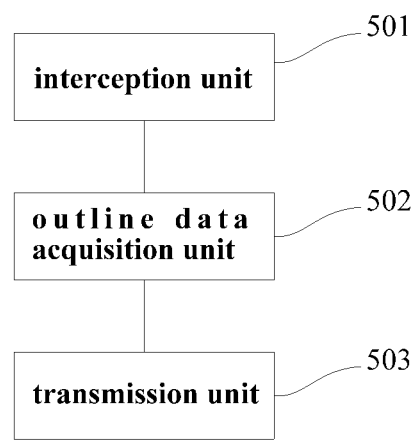
FIG. 5 is a schematic diagram showing a structure of an apparatus for displaying a character according to an embodiment of this invention.

Further, an apparatus for displaying a character is provided in an embodiment of the present invention. FIG. 5 shows a schematic diagram of the structure of this apparatus.

In this embodiment, the apparatus comprises:

an interception unit 501, configured for intercepting a font invoking message sent from a system font engine, the font invoking message comprising a character code and a font name corresponding to a character to be displayed by an application;

a outline data acquisition unit 502, configured for acquiring outline data corresponding to the character from an ultra-large character library based on the character code and the font name, the ultra-large character library being a character library in a non-standard format;

a transmission unit 503, configured for transmitting the outline data of the character to the system font engine to enable the system font engine to display the character according to the character outline data.

Compared with existing standard-format character libraries, the ultra-large character library may contain information regarding more character codes and more outline data, and its content is similar to that of the standard-format character library, which has been described above and will not be described in detail herein.

In an actual application, the interception unit 501 may use a hook function to intercept the font invoking message, and obtain the character code and the font name.

The outline data acquisition unit 502 comprises: a font file searching subunit, an index value searching subunit, and an obtaining subunit (not shown).

The font file searching subunit is configured for searching the ultra-large character library for a font file based on the font name. The index value searching subunit is configured for obtaining an index value corresponding to the character code from the found font file based on the character code. The obtaining subunit is configured for obtaining outline data of the character from a character outline data table according to the index value.

In the apparatus for displaying a character according to the embodiment of the present invention, the font invoking message sent from the system font engine to the boot character library is intercepted, so that the access of the system font engine to the boot character library is converted into an access of the font engine middleware to the ultra-large character library. After the access to the ultra-large character library, glyph outline data thus obtained is returned to the system font engine, thereby the retrieve and display of the character may be realized in a simple and convenient manner, greatly increasing efficiency of character displaying. From the view of the application layer, it appears that the access is performed by the system font engine itself, without any effect on users' experience.

It should be noted that the character displaying method and apparatus according to the embodiment of the present invention may be applicable to a variety of applications to meet a various requirements of those applications, and are fast and efficient.

The embodiments in the present specification are described in a progressive manner. For the same or similar parts of various embodiments, reference may be made among the embodiments. Each embodiment focuses on the differences from other embodiments. Particularly, because the apparatus embodiments basically correspond to the method embodiments, reference can be made to the description of the method embodiments for relevant parts. The apparatus embodiments described above are merely illustrative, in which elements that are described as separated parts may be or may not be physically separated from each other, and those ones shown individually may be or may not be physical elements, which may be positioned at one position or may be distributed over multiple network units. Some or all modules thereof may be selected as required to realize the object of the embodiments of this invention as can be understood and implemented by those skilled in the art without any creative effort.

This disclosure also provides one or more computer readable medium having stored thereon computer-executable instructions that when executed by a computer perform various steps of the method for establishing an ultra-large character library and the method for displaying a character as described above.

This disclosure also provides a computer with one or more computer readable medium having stored thereon computer-executable instructions that when executed by the computer perform various steps of the method for establishing an ultra-large character library and the method for displaying a character as described above.

Exemplary Operating Environment

The computer or computing device as described herein comprises hardware, including one or more processors or processing units, system memory and some types of computer readable media. By way of example and not limitation, computer readable media comprise computer storage media and communication media. Computer storage media comprises volatile or non-volatile, removable or non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may use one or more remote computers, such as logical connections to remote computers operated in a networked environment. Although various embodiments of the present disclosure are described in the context of the exemplary computing system environment, various embodiments of the present disclosure may be used with numerous other general purpose or application specific computing system environments or configurations. The computing system environment is not intended for limiting any aspect of the scope of use or functionality of the invention. In addition, the computer environment should not be interpreted as depending on or requiring any one or combination of components shown in the exemplary operating environment. Well-known examples of the computing systems, the environment and/or configurations suitable for all aspects of the present disclosure include, but are not limited to: personal computers, server computers, handheld or laptop devices, multiprocessor systems, microprocessor-based systems, set top boxes, programmable consumer electronics, mobile phone, network PC, minicomputers, mainframe computers, distributed computing environments including any one of the above systems or devices, and so on.

Various embodiments of the invention may be described in a general context of computer executable instructions such as program modules executed on one or more computers or other devices. The computer-executable instructions may be organized into one or more computer-executable components or modules as software. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Some specific embodiments have been described above only by the way of examples, but would not limit the protection scope of the present invention. Those skilled in the art may readily make any modification and variation to the invention without departing from the spirit and scope of the invention, and such modifications and variations of the invention would be encompassed within the protection scope of the invention.

What is claimed is:

1. A method for establishing an ultra-large character library, comprising:
    establishing, by a computer, a boot character library, wherein the boot character library can be interpreted by a system font displaying engine;
    establishing, by the computer, an ultra-large character library in a non-standard format, wherein the ultra-large character library cannot be interpreted by the system font displaying engine;
    creating, by the computer, a font displaying engine middleware for interpreting the ultra-large character library;
    wherein the font displaying engine middleware incorporates a one-to-one correspondence established between the boot character library and the ultra-large character library, and wherein, in the case that an application requires the system font displaying engine to display any one of characters including basic ASCII symbols and Chinese characters, the font displaying engine middleware intercepts a font invoking message sent from the system font displaying engine to the boot character library, regardless of whether the boot character library contains information about the character to be displayed, the font invoking message comprising a character code and a font name corresponding to the character to be displayed, accesses the ultra-large character library based on the one-to-one correspondence established between the boot character library and the ultra-large character library, regardless of whether the boot character library contains information about the character to be displayed or not, acquires outline data corresponding to the character from the ultra-large character library based on the character code and the font name, and transmits the outline data of the character to the system font displaying engine to enable the system font displaying engine to display the character according to the character outline data
    wherein, the boot character library comprises only basic ASCII symbols.

2. The method according to claim 1, wherein codes in the ultra-large character library in the non-standard format are 4-byte codes.

3. The method according to claim 2, wherein the ultra-large character library in the non-standard format comprises: a code table for storing a correspondence between character codes and indexes, a position information table for storing a correspondence between the indexes and character data offsets, and a glyph table for storing character outline data.

4. A method for displaying a character, comprising:
intercepting, by a font displaying engine middleware, a font invoking message sent from a system font displaying engine to a boot character library in the case that an application requires the system font displaying engine to display any one of characters including basic ASCII symbols and Chinese characters, regardless of whether the boot character library contains information about the character to be displayed or not, the font invoking message comprising a character code and a font name corresponding to the character to be displayed;
accessing, by the font displaying engine middleware, an ultra-large character library based on a one-to-one correspondence established between the boot character library and the ultra-large character library, and acquiring, by the font displaying engine middleware, outline data corresponding to the character from the ultra-large character library based on the character code and the font name, the ultra-large character library being a character library in a non-standard format;
transmitting, by the font displaying engine middleware, the outline data of the character to the system font displaying engine, to enable the system font displaying engine to display the character according to the character outline data;
wherein the system font displaying engine can interpret the boot character library but cannot interpret the ultra-large character library, and the boot character library comprises only basic ASCII symbols.

5. The method according to claim 4, wherein intercepting by a font displaying engine middleware a font invoking message sent from a system font displaying engine comprises:
intercepting the font invoking message by the font displaying engine middleware using a hook function, and obtaining the character code and the font name.

6. The method according to claim 4, wherein acquiring outline data corresponding to the character from an ultra-large character library based on the character code and the font name comprises:
searching the ultra-large character library for a font file based on the font name;
obtaining an index value corresponding to the character code from the found font file based on the character code;
obtaining outline data of the character from a character outline data table based on the index value.

7. An apparatus for establishing an ultra-large character library, comprising:
one or more processors;
one or more memories storing instructions that when executed by the processors cause the processors to perform steps of:
establishing a boot character library, wherein the boot character library can be interpreted by a system font displaying engine;
establishing an ultra-large character library in a non-standard format, wherein the ultra-large character library cannot be interpreted by the system font displaying engine;
creating a font displaying engine middleware for interpreting the ultra-large character library;
wherein, the font displaying engine middleware incorporates a one-to-one correspondence established between the boot character library and the ultra-large character library, and
wherein, the font displaying engine middleware intercepts a font invoking message sent from the system font displaying engine to the boot character library in the case that an application requires the system font displaying engine to display any one of characters including basic ASCII symbols and Chinese characters, regardless of whether the boot character library contains information about the character to be displayed or not, the font invoking message comprising a character code and a font name corresponding to the character to be displayed, accesses the ultra-large character library based on the one-to-one correspondence established between the boot character library and the ultra-large character library, acquires outline data corresponding to the character from the ultra-large character library based on the character code and the font name, and transmits the outline data of the character to the system font displaying engine to enable the system font displaying engine to display the character according to the character outline data; and
wherein, the boot character library comprises only basic ASCII symbols.

8. An apparatus for displaying a character, comprising:
one or more processors;
one or more memories storing instructions that when executed by the processors cause the processors to perform steps of:
intercepting a font invoking message sent from a system font displaying engine to a boot character library in the case that an application requires the system font displaying engine to display any one of characters including basic ASCII symbols and Chinese characters, regardless of whether the boot character library contains information about the character to be displayed or not, the font invoking message comprising a character code and a font name corresponding to the character to be displayed;
accessing an ultra-large character library based on a one-to-one correspondence established between the boot character library and the ultra-large character library, and acquiring outline data corresponding to the character from the ultra-large character library based on the character code and the font name, the ultra-large character library being a character library in a non-standard format; transmitting the outline data of the character to the system font displaying engine to enable the system font displaying engine to display the character according to the character outline data;
wherein the system font displaying engine can interpret the boot character library but cannot interpret the ultra-large character library, and the boot character library comprises only basic ASCII symbols.

9. The apparatus according to claim 8, wherein the intercepting step comprises intercepting the font invoking message by using a hook function, and obtaining the character code and the font name.

10. The apparatus according to claim 8, wherein the acquiring step comprises:
searching the ultra-large character library for a font file based on the font name;

obtaining an index value corresponding to the character code from the found font file based on the character code;

obtaining outline data of the character from a character outline data table according to the index value.

\* \* \* \* \*